(12) United States Patent
Fukushiro

(10) Patent No.: US 8,977,448 B2
(45) Date of Patent: Mar. 10, 2015

(54) VEHICLE OPERATING STATE DISPLAY DEVICE

(75) Inventor: Eiji Fukushiro, Tokai (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 184 days.

(21) Appl. No.: 13/483,385

(22) Filed: May 30, 2012

(65) Prior Publication Data

US 2012/0310441 A1  Dec. 6, 2012

(30) Foreign Application Priority Data

Jun. 3, 2011  (JP) ................ 2011-125454

(51) Int. Cl.
| | |
|---|---|
| *B60W 10/00* | (2006.01) |
| *B60W 20/00* | (2006.01) |
| *B60W 10/08* | (2006.01) |
| *B60W 30/18* | (2012.01) |
| *B60K 35/00* | (2006.01) |

(52) U.S. Cl.
CPC ........... *B60W 20/1084* (2013.01); *B60W 10/08* (2013.01); *B60W 30/18054* (2013.01); *B60K 35/00* (2013.01); *B60Y 2300/66* (2013.01); *B60Y 2300/77* (2013.01); *B60W 2510/109* (2013.01); *B60W 2540/12* (2013.01); *B60W 2550/142* (2013.01); *B60K 2350/1092* (2013.01)
USPC .................. 701/53; 701/1; 701/22; 701/123; 701/408; 701/461; 340/439; 340/455; 340/461; 340/995.14

(58) Field of Classification Search
CPC . B60W 10/00; B60W 50/00; B60W 2550/00; B60L 3/00; B60L 11/00; B60L 2250/00
USPC .................. 701/1, 22, 123, 408, 461, 51, 53; 340/439, 455, 461, 995.14
See application file for complete search history.

(56) References Cited

U.S. PATENT DOCUMENTS

| | | | | |
|---|---|---|---|---|
| 6,651,759 | B1 * | 11/2003 | Gruenwald et al. | 180/65.245 |
| 7,004,273 | B1 * | 2/2006 | Gruenwald et al. | 180/65.245 |
| 7,252,165 | B1 * | 8/2007 | Gruenwald et al. | 180/65.25 |
| 7,750,796 | B2 * | 7/2010 | Borroni-Bird et al. | 340/438 |
| 8,058,982 | B2 * | 11/2011 | Crowe et al. | 340/455 |
| 8,386,104 | B2 * | 2/2013 | Kuang et al. | 701/22 |
| 2007/0208468 | A1 * | 9/2007 | Sankaran et al. | 701/29 |
| 2009/0018716 | A1 * | 1/2009 | Ambrosio | 701/22 |
| 2009/0040033 | A1 * | 2/2009 | Uchida | 340/439 |
| 2010/0052888 | A1 * | 3/2010 | Crowe et al. | 340/461 |
| 2010/0057280 | A1 * | 3/2010 | Crowe et al. | 701/22 |
| 2010/0305795 | A1 * | 12/2010 | Kuang et al. | 701/22 |

FOREIGN PATENT DOCUMENTS

| | | |
|---|---|---|
| JP | 2009-143500 A | 7/2009 |
| JP | 2010-167960 A | 8/2010 |

* cited by examiner

*Primary Examiner* — John R Olszewski
*Assistant Examiner* — Truc M. Do
(74) *Attorney, Agent, or Firm* — Sughrue Mion, PLLC

(57) ABSTRACT

An operating state display device for a vehicle includes a display portion that displays an energy transmission state of the vehicle. A display similar to what is shown when no energy is being transmitted to the axle is shown, regardless of the energy transmission state, when two conditions that the vehicle is stopped and that a brake operation is being performed are satisfied.

6 Claims, 4 Drawing Sheets

VEHICLE OPERATING STATE DISPLAY DEVICE

INCORPORATION BY REFERENCE

The disclosure of Japanese Patent Application No. 2011-125454 filed on Jun. 3, 2011 including the specification, drawings and abstract is incorporated herein by reference in its entirety.

BACKGROUND OF THE INVENTION

1. Field of the Invention

The invention relates to a vehicle operating state display device that displays the energy transmission state of a vehicle.

2. Description of Related Art

In recent years, a hybrid vehicle that runs by transmitting the output from two drive sources, i.e., an electric motor and an engine, to an axle via a transmission has been put into practical use. With this type of vehicle, the transmission state of energy between the engine, the electric motor, the axle, and a battery changes from moment to moment according to the running state of the vehicle. Therefore, this type of vehicle may be provided with an operating state display device that displays the current energy transmission state on a monitor of a car navigation system or an instrument panel or the like, as can be seen in Japanese Patent Application Publication No. 2010-167960 (JP 2010-167960 A), for example.

With this vehicle operating state display device, when the vehicle is being driven by the engine, for example, a display indicating that energy is being transmitted from the engine to the axle is shown. Also, when power is being generated by regenerative braking, a display indicating that energy is being transmitted from the axle to a motor-generator and from the motor-generator to the battery is shown.

However, with a hybrid vehicle such as that described above, if the frequency of engine vibration matches a specific frequency of the drive-train while the engine is starting, resonance will occur, which may result in torque shock and an abnormal noise referred to as so-called rattling, due to gears in the transmission striking each other. Therefore, in this kind of hybrid vehicle, so-called push control of the electric motor that reduces backlash in the transmission by applying torque from the electric motor is performed in an attempt to prevent or reduce this kind of torque shock and abnormal noise. Depending on this push control, a certain degree of torque is transmitted from the electric motor to the axle, so with an operating state display device such as that described in JP 2010-167960 A, a display indicating that energy is being transmitted from the electric motor to the axle is shown.

However, if there is a display indicating that energy is being transmitted to the axle while the vehicle is stopped by a brake operation being performed, the driver may mistakenly think that unnecessary consumption of energy is occurring because driving force is being generated even though the vehicle is not moving. Also, with control other than push control as well, if, while the vehicle is stopped, torque is generated for a purpose other than moving the vehicle, the driver may similarly mistakenly think that unnecessary consumption of energy is occurring due to the transmission of energy to the axle according to that generation of torque being shown.

SUMMARY OF THE INVENTION

The invention thus provides a vehicle operating state display device capable of showing an appropriate display that will not mislead a driver.

A first aspect of the invention relates to an operating state display device for a vehicle. More specifically, the first aspect of the invention relates to an operating state display device for a hybrid vehicle that runs by transmitting output from two drive sources that are an electric motor and an engine to an axle via a transmission. This operating state display device includes a display portion that displays an energy transmission state of the vehicle. Then, a display similar to what is shown when no energy is being transmitted to the axle is shown, regardless of the energy transmission state (the presence or absence of an energy flow), when three conditions that (i) the vehicle is stopped, that (ii) a brake operation is being performed, and that (iii) torque is being applied by the electric motor to reduce backlash of gears in the transmission, are satisfied.

With the structure described above, when the vehicle is stopped and a brake operation is being performed, even if driving force for so-called push control is generated, i.e., even if energy is transmitted to the axle, a display indicating that energy is being transmitted to the axle will not be shown. Therefore, a display indicating that driving force is being generated even though the vehicle is not moving is avoided, so the driver will not be misled. With the structure described above, a situation where "a display similar to what is shown when no energy is being transmitted to the axle is shown" includes a situation where a display indicating the energy transmission state (the energy flow) of the vehicle is not shown.

A second aspect of the invention relates to an operating state display device for a vehicle. This operating state display device includes a display portion that displays an energy transmission state of the vehicle. Then, a display similar to what is shown when no energy is being transmitted to the axle is shown, regardless of the energy transmission state, when two conditions that (i) the vehicle is stopped and that (ii) a brake operation is being performed are satisfied.

With this structure, if the vehicle is stopped and a brake operation is being performed, even if driving force is generated by the push control or the like described above, a display indicating that energy is being transmitted to the axle will not be shown. Therefore, a display indicating that driving force is being generated even though the vehicle is not moving is avoided, so the driver will not be misled. With the structure described above, a situation where "a display similar to what is shown when no energy is being transmitted to the axle is shown" includes a situation where a display indicating the energy transmission state of the vehicle is not shown.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
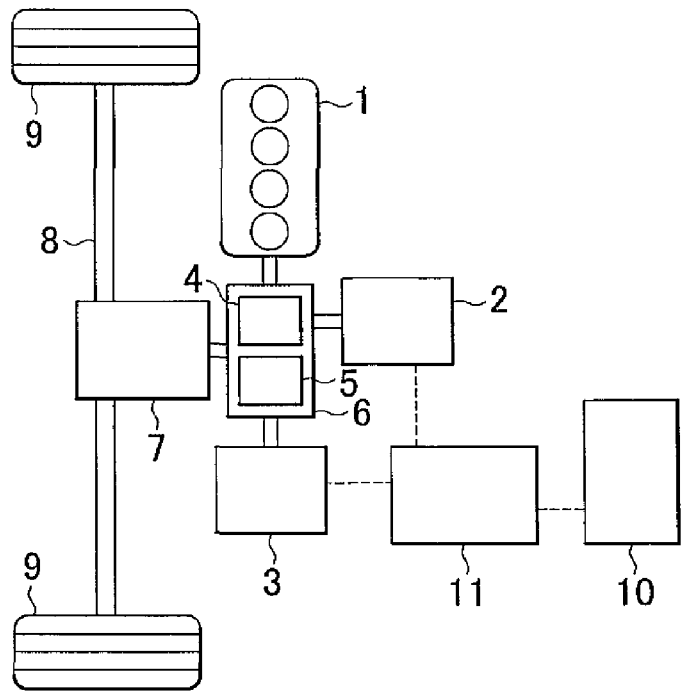
FIG. 1 is a simplified diagram showing a frame format of the structure of a drive-train of a hybrid vehicle to which a vehicle operating state display device according to an example embodiment of the invention has been applied.

Hereinafter, example embodiments of the vehicle operating state display device of the invention will be described in detail with reference to FIGS. 1 to 6. First, referring to FIG. 1, the structure of a drive-train of a hybrid vehicle to which the vehicle operating state display device of this example embodiment may be applied will be described. As shown in FIG. 1, the hybrid vehicle is provided with an engine 1 that generates driving force by burning fuel, and two motor-generators, i.e., a first motor-generator (i.e., a first MG) 2 and a second motor-generator (i.e., a second MG) 3, that generate driving force from a supply of electric power and generate electricity from driving force that is input. The engine 1, the first MG 2, and the second MG 3 are each drivingly connected to a power split device 6 that is formed with two planetary gears, i.e., a power splitting planetary gear 4 and a reduction planetary gear 5. The power split device 6 is also drivingly connected to an axle (i.e., a propeller shaft) 8 of driving wheels 9 via a transmission 7. The first MG 2 and the second MG 3 are electrically connected to a battery 10 via an inverter 11.

Figure 2:
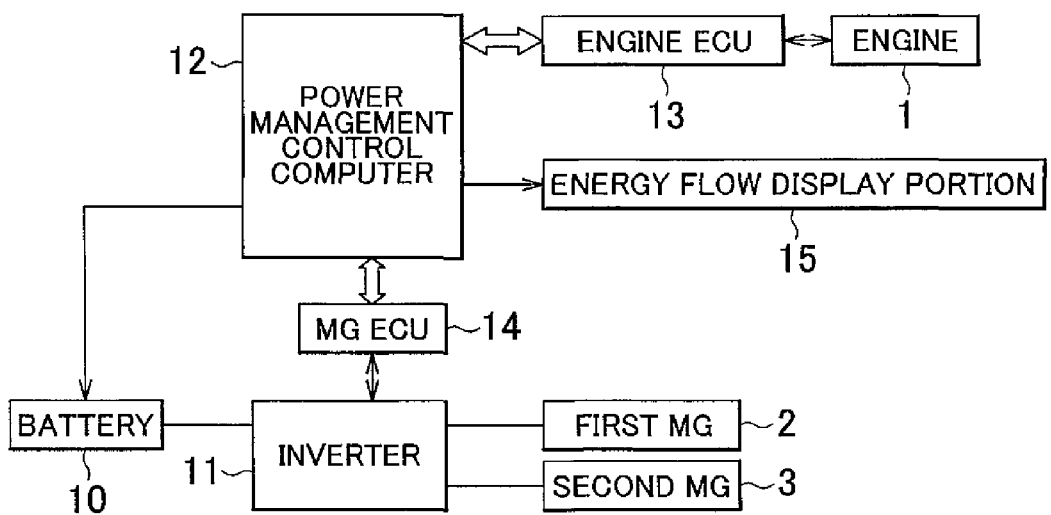
FIG. 2 is a simplified diagram showing a frame format of a control system of the hybrid vehicle in this example embodiment.

Next, the structure of a control system of the hybrid vehicle having this kind of drive-train will be described with reference to FIG. 2. The control system of the hybrid vehicle is formed around a power management computer 12 that performs power management of the vehicle. The power management computer 12 controls the battery 10, and is connected via a vehicle internal network to an engine ECU 13 that is responsible for controlling the engine 1, and an MG ECU 14 that is responsible for controlling the first MG 2 and the second MG 3 according to control of the inverter 11.

Figure 3:
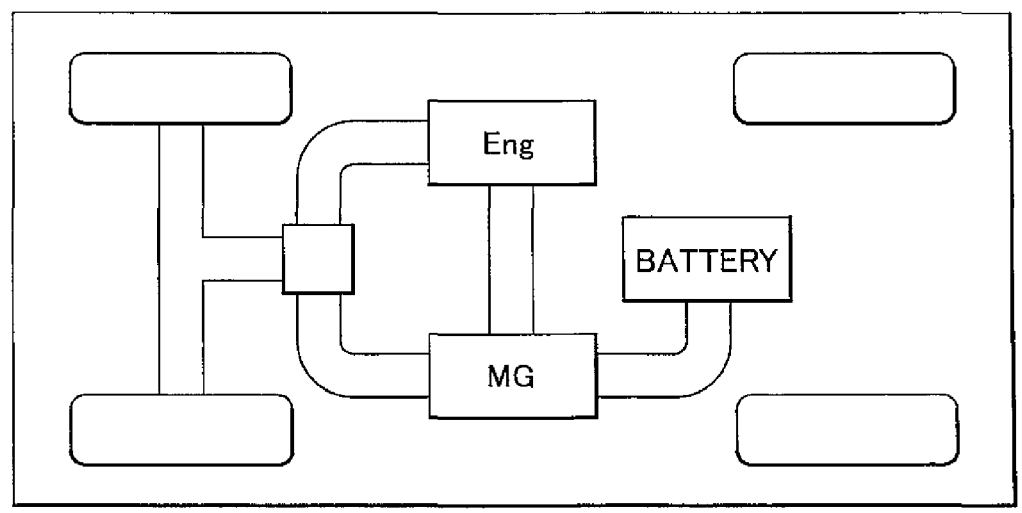
FIG. 3 is a view of a screen configuration of an energy flow display portion employed in this example embodiment.
Figure 4:
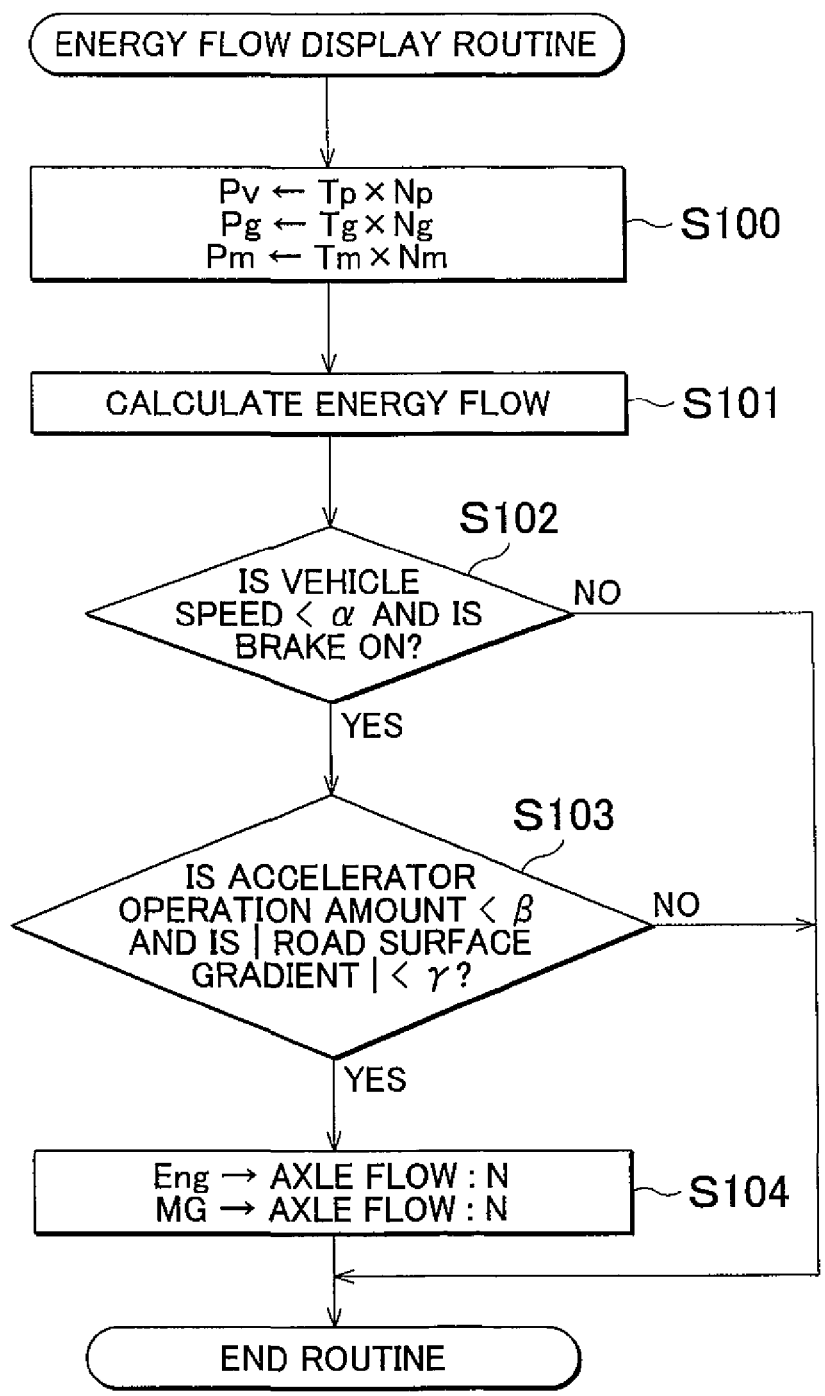
FIG. 4 is a flowchart illustrating the process flow of an energy flow display routine employed in this example embodiment.

Also, the power management computer 12 also controls the screen display of an energy flow display portion 15 that displays the energy transmission state of the hybrid vehicle. As shown in FIG. 3, the screen of the energy flow display portion 15 is configured to show the transmission state of energy between various elements of the hybrid vehicle, i.e., the engine 1, the MG (i.e., the first MG 2 and the second MG 3), the axle 8, and the battery 10.

Continuing on, the screen display control of this energy flow display portion 15 will be described in detail. The screen display control of the energy flow display portion 15 is performed through an energy flow display routine shown in FIG. 4. The energy flow display routine is repeatedly executed in specified control cycles by the power management computer 12.

When the energy flow display routine starts, first in step S100, an axle driving force Pv, a power generation amount Pg of the first MG 2 and a power discharge amount Pm of the second MG 3 are calculated. The axle driving force Pv of the axle 8 is calculated by multiplying the torque Tp of the axle 8 by the rotation speed Np of the axle 8. Also, the power generation amount Pg of the first MG 2 is calculated by multiplying the input torque Tg of the first MG 2 by the rotation speed Ng of the first MG 2, and the power discharge amount Pm of the second MG 3 is calculated by multiplying the output torque Tm of the second MG 3 by the rotation speed Nm of the second MG 3.

Continuing on, in step S101, the energy transmission state (i.e., the energy flow) between the various elements of the hybrid vehicle is calculated. In calculating this energy flow, the manner in which energy is being transmitted between the various elements of the hybrid vehicle is calculated from the shift position and the operating states of the engine 1, the first MG 2, and the second MG 3.

When the energy flow is calculated in this way, next in step S102, a check is performed to determine whether the vehicle speed is less than a specified determining value α, that is, whether the hybrid vehicle is substantially stopped, and whether a brake operation is being performed (i.e., whether the brake is on). If either of these two conditions is not satisfied (i.e., NO in step S102), then this cycle of the routine immediately ends. In this case, a screen display of the energy flow display portion 15 of the energy flow calculated earlier in step S101 is shown.

On the other hand, if both of these two conditions are satisfied (i.e., YES in step S102), then the process proceeds on to step S103. When the process proceeds on to step S103, in step S103, a check is performed to determine whether an accelerator operation amount is less than a specified determining value β, that is, whether an accelerator operation of equal to or greater than a certain value is not being performed, and whether an absolute value of a road surface gradient is less than a specified determining value γ, that is, whether the gradient of the road surface on which the vehicle is positioned is not equal to or greater than certain value. If either of these two conditions is not satisfied (i.e., NO in step S103), this cycle of the routine immediately ends. In this case, a screen display of the energy flow display portion 15 of the energy flow calculated earlier in step S101 is shown.

On the other hand, if both of these two conditions are satisfied (i.e., YES in step S103), the process proceeds on to step S104. In step S104, the value of the energy flow of "the engine 1→axle 8", and the value of the energy flow of the "MG→axle 8" are both rewritten to "N". Then this cycle of the routine ends.

Next, the operation of this example embodiment structured as described above will be described. In the hybrid vehicle in this example embodiment, when the vehicle is stopped and a brake operation is being performed, basically energy (i.e., power) will not be transmitted from the engine 1 and the MG to the axle 8. However, in this hybrid vehicle, in this state as well, push control of the electric motor that reduces backlash in the transmission by applying torque from the electric motor may be performed at engine startup in order to prevent or reduce torque shock and abnormal noise due to gears in the transmission striking each other. In this case, even if the vehicle is stopped and a brake operation is being performed, energy will be transmitted from the MG to the axle 8.

However, in this example embodiment, when two conditions, i.e., that the hybrid vehicle be stopped and a brake operation be being performed; are satisfied, even if energy (i.e., power) is actually transmitted from the engine 1 and the MG to the axle 8, a display indicating no such energy transmission will be shown on the screen of the energy flow display portion 15. Therefore, a display indicating that driving force is being generated even though the vehicle is not moving is avoided, so the driver will not be misled.

Figure 5:
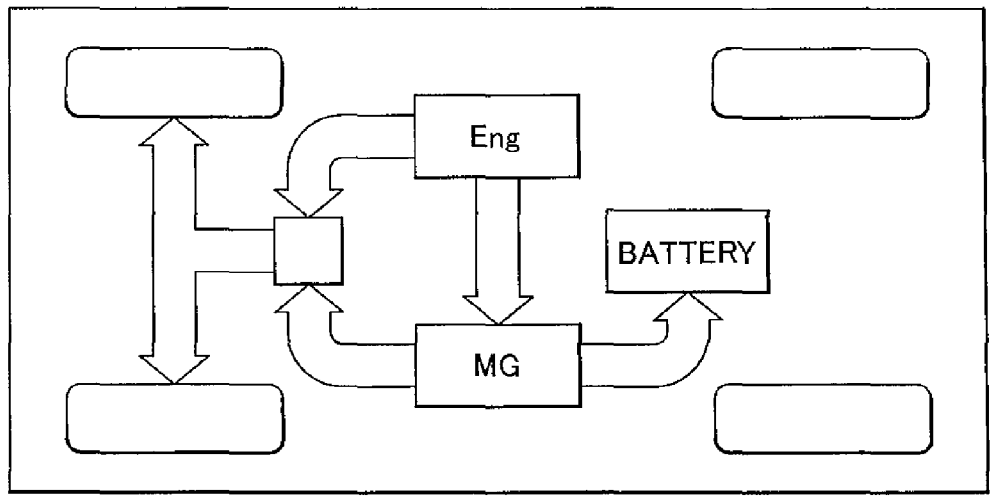
FIG. 5 is a view showing an example of a screen display of the energy flow display portion employed in this example embodiment.
Figure 6:
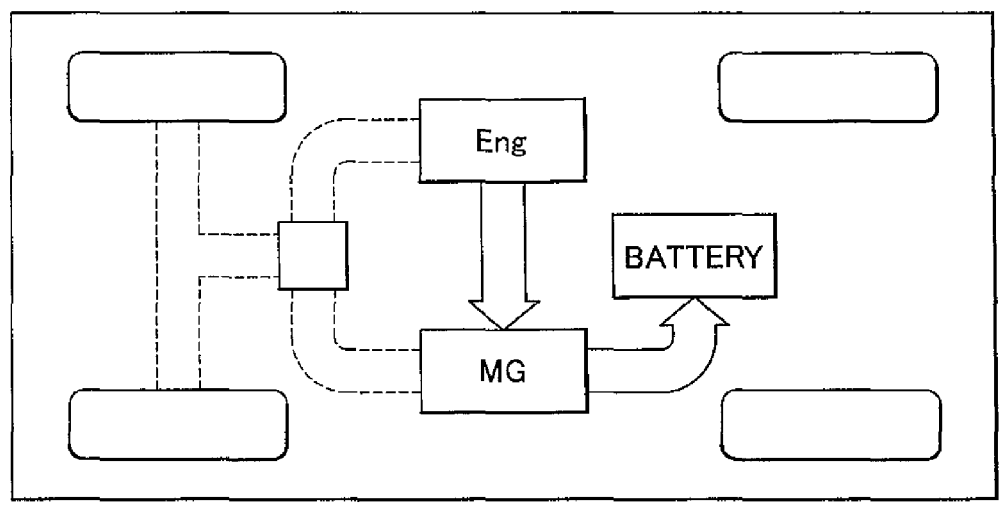
FIG. 6 is a view of an example of a screen display of the energy flow display portion employed in this example embodiment.

For example, when energy (i.e., power) is transmitted from the engine 1 and the MG to the axle 8, normally, the screen display of the energy flow display portion 15 is shown in the manner shown in FIG. 5. However, in this case as well, if the vehicle is stopped and a brake operation is being performed, the screen display of the energy flow display portion 15 is shown in the manner shown in FIG. 6. That is, at this time, even though energy is actually being transmitted from the engine 1 to the axle 8 and/or from the MG to the axle 8, a screen display indicating no such energy transmission is shown.

With the hybrid vehicle of this example embodiment, energy is transmitted from the engine 1 and the MG to the axle 8 while the vehicle is stopped and a brake operation is being performed, only when torque is applied by the MG to reduce backlash of the gears in the power split device 6 and the transmission 7. Therefore, even if energy is actually being transmitted from the engine 1 and the MG to the axle 8, a display indicating no such energy transmission is shown when all of three conditions that the vehicle be stopped, a brake operation be being performed, and push control of the MG be being performed are satisfied.

Also, in this example embodiment, even if the two conditions that the hybrid vehicle be stopped and a brake operation be being performed (or the three conditions that the hybrid vehicle be stopped, a brake operation be being performed, and push control of the MG be being performed) are satisfied, when the gradient of the road surface on which the vehicle is positioned is equal to or greater than a certain value, a display indicating that energy is being transmitted from the engine 1 and the MG to the axle 8 is shown. Further, a display indicating that energy is being transmitted to the axle 8 is also shown when an accelerator operation of equal to or greater than a certain value is being performed.

In this example embodiment, the power split device 6 and the transmission 7 correspond to the transmission. Also, the first MG 2 and the second MG 3 correspond to the electric motor.

The vehicle operating state display device of this example embodiment is able to yield the effects described below. When both of two conditions that the vehicle be stopped and a brake operation be being performed are satisfied, even if torque from the MG to reduce back lash of the gears in the power split device 6 and the transmission 7 is applied such that energy is transmitted from the MG to the axle 8, a display indicating such energy transmission is not shown. Therefore, a display indicating that driving force is being generated even though the vehicle is not moving is avoided, so the driver will not be misled.

In this example embodiment, even if the two conditions that the vehicle be stopped and a brake operation be being performed are both satisfied, a display indicating that energy is being transmitted to the axle 8 is shown if the gradient of the road surface on which the vehicle is positioned is equal to or greater than a certain value. Therefore, the driver is notified that driving force to prevent the vehicle from slipping down is being generated, so the driver can be provided with a sense of security.

In this example embodiment, even if the two conditions that the vehicle be stopped and a brake operation be being performed are both satisfied, a display indicating that energy is being transmitted to the axle 8 is shown when an accelerator operation of equal to or greater than a certain value is being performed, i.e., when the brake and the accelerator are being operated simultaneously. Even if a brake operation is being performed, if an accelerator operation is being performed at the same time as the brake operation, driving force is of course generated in the axle 8, so the display can be made to match the operation of the driver.

The example embodiment described above may also be modified in the ways described below.

In the example embodiment described above, when there is a brake operation while the vehicle is stopped, and torque is applied by the MG according to push control, a display indicating that energy is being transmitted to the axle 8 is not shown. Naturally, in a state other than push control, if energy is transmitted to the axle 8 while the vehicle is stopped and a brake operation is being performed, a display indicating that energy is being transmitted to the axle 8 may not be shown in this case as well.

In the example embodiment described above, even if a condition that a display that does not indicate the transmission of energy to the axle 8 that is actually taking place be shown is satisfied, when the gradient of a road surface on which the vehicle is positioned is equal to or greater than a certain value, a display indicating that energy is being transmitted to the axle 8 is shown. However, when driving force to prevent the vehicle from slipping down on a hill is not generated, the process related to a display indicating such may also be omitted.

In the example embodiment described above, even if a condition that a display that does not indicate the transmission of energy to the axle 8 that is actually taking place be shown is satisfied, if an accelerator operation of equal to or greater than a certain value is being performed, a display indicating that energy is being transmitted to the axle 8 is shown. Of course, if driving force is prevented from being generated when the brake and the accelerator are operated at the same time, the process related to a display indicating such may also be omitted.

The mode of the screen display of the energy flow display portion 15 is not limited to that illustrated in the example embodiment described above. That is, a suitable screen configuration may be employed. The invention may also similarly be applied to a hybrid vehicle in which the structures of the drive-train and the control system are different from those described in the foregoing example embodiment.

What is claimed is:

1. An operating state display device for a hybrid vehicle that runs by transmitting output from two drive sources including an electric motor and an engine to an axle via a transmission, comprising:
   a display portion that displays an energy transmission state of the vehicle; and
   a controller programmed to control a display of the display portion,
   wherein, regardless of an energy state, the controller controls the display portion to show a display similar to what is shown when no energy is being transmitted to the axle, when all of the following three conditions are satisfied (i) the vehicle is stopped, (ii) a brake operation is being performed, and (iii) torque is being applied by the electric motor to reduce backlash of gears in the transmission.

2. The operating state display device according to claim 1, wherein when a gradient of a road surface on which the vehicle is positioned is equal to or greater than a certain value, a display indicating that energy is being transmitted to the axle is shown by the display portion, even if the three conditions are satisfied.

3. The operating state display device according to claim 1, wherein when an amount of an accelerator operation is equal to or greater than a certain value, a display indicating that energy is being transmitted to the axle is shown by the display portion, even if the three conditions are satisfied.

4. An operating state display device for a vehicle having an engine and a motor generator that transmit energy to an axle and, comprising:
   a display portion that displays an energy transmission state of the vehicle; and a controller programmed to control a display of the display portion, wherein, when energy is being transmitted to the axle, the controller controls the display portion to show a display similar to what is shown when no energy is being transmitted to the axle, when both of the following two conditions are satisfied: (i) the vehicle is stopped, and (ii) a brake operation is being performed.

5. The operating state display device according to claim 4, wherein when a gradient of a road surface on which the vehicle is positioned is equal to or greater than a certain value, a display indicating that energy is being transmitted to the axle is shown by the display portion, even if the two conditions are satisfied.

6. The operating state display device according to claim 4, wherein when an accelerator operation of equal to or greater than a certain value is being performed, a display indicating that energy is being transmitted to the axle is shown by the display portion, even if the two conditions are satisfied.

* * * * *